(12) United States Patent
Stimpfl

(10) Patent No.: US 6,932,689 B2  
(45) Date of Patent: Aug. 23, 2005

(54) APPARATUS FOR SEVERING THE LINK BETWEEN TWO SAUSAGES

(75) Inventor: Christoph Stimpfl, Vogt (DE)

(73) Assignee: Stimpfl & Gieseler Sondermaschinen F. Lebensmittelindustrie, Vogt (DE)

( * ) Notice: Subject to any disclaimer, the term of this patent is extended or adjusted under 35 U.S.C. 154(b) by 0 days.

(21) Appl. No.: 10/640,226

(22) Filed: Aug. 13, 2003

(65) Prior Publication Data

US 2004/0072523 A1 Apr. 15, 2004

(30) Foreign Application Priority Data

Aug. 14, 2002 (DE) .......................................... 102 37 909

(51) Int. Cl.[7] .............................................. A22C 11/00
(52) U.S. Cl. ........................................ 452/49; 452/51
(58) Field of Search .............................. 452/46, 47, 48, 452/49, 50, 51

(56) References Cited

U.S. PATENT DOCUMENTS

| | | | | |
|---|---|---|---|---|
| 2,676,354 A | * | 4/1954 | Mosby | 452/31 |
| 4,060,875 A | * | 12/1977 | Gosling et al. | 452/31 |
| 4,214,492 A | * | 7/1980 | Hoffman | 83/24 |
| 4,463,641 A | * | 8/1984 | Sato | 83/175 |
| 5,145,450 A | * | 9/1992 | Staudenrausch et al. | 452/47 |
| 5,173,075 A | * | 12/1992 | Wadell | 452/46 |
| 5,199,922 A | * | 4/1993 | Korenberg et al. | 452/122 |
| 5,421,137 A | * | 6/1995 | Stimpfl | 53/435 |
| 6,045,445 A | * | 4/2000 | Hummel et al. | 452/46 |
| 6,080,054 A | * | 6/2000 | Muller et al. | 452/49 |

FOREIGN PATENT DOCUMENTS

| | | | |
|---|---|---|---|
| DE | 31 21 432 | | 1/1983 |
| DE | 3535960 | * | 2/1987 |
| DE | 43 18 310 | | 2/1995 |
| DE | 43 07 637 | | 6/1995 |
| DE | 100 12 149 | | 2/2003 |

* cited by examiner

Primary Examiner—Peter M. Poon  
Assistant Examiner—David J Parsley  
(74) Attorney, Agent, or Firm—Bachman & LaPointe, P.C.

(57) ABSTRACT

In an apparatus for severing a link between two sausages, in particular for cutting out a clip at a twisting point by means of a cutting device which has a cutting edge, comprises at least two cutting edges lying opposite one another and movable toward one another when the twisting point is located between them.

13 Claims, 4 Drawing Sheets

APPARATUS FOR SEVERING THE LINK BETWEEN TWO SAUSAGES

BACKGROUND OF THE INVENTION

The invention relates to an apparatus for severing the link between two sausages, in particular for cutting out a clip at a twisting point, by means of a cutting device which has a cutting edge.

Nowadays, sausages are produced by filling a skin, whether this be a natural or synthetic skin, with a suitable sausage filling in sausage portions. The individual sausages are separated between the individual portions, usually by fitting clips and/or twisting the skin, for which reason this point is also known as the twisting point. The result is a string of sausages, from which these sausages subsequently have to be cut off, for example in order to automatically package a certain number of sausages. Today this is still carried out, at great expense, by hand.

DD 106 131 has disclosed a device for separating individual sausages from a string of sausages, which device comprises two part conveyor systems, each with a pair of conveyor belts. If a twist between the sausages passes through a detection system, a separation system is actuated and the twist is cut through. This detection system operates using a light barrier and mirrors and is therefore unsuitable for precise control of the cutting operation at the desired high speeds. A light barrier of this nature is extremely sensitive to extraneous light, and the mirrors are subject to contamination, so that the determination of twisting points is extremely unsatisfactory. This alone renders known devices unsuitable. In addition, the cutting device itself, which is designed as a lifting blade, has proven entirely unsuitable for the speeds which are required nowadays. The device is dubious in safety terms, since it has a valve shut-off system which always returns to the starting position even in the event of a fault.

Furthermore, DE-A 31 21 432 has disclosed a sausage-cutting machine of the type mentioned above which has a sensor whose radiation source feeds a beam of electromagnetic waves beyond the path of the sausages to a sensor. In this case too, mirrors are used, and these can easily become contaminated or coated with a film of grease from the sausages. The blade and its drive are entirely unsuitable for the high working rate of a sausage-cutting machine which is required nowadays.

DE-A 43 07 637 has also disclosed an apparatus for separating sausages from a string of sausages. This document primarily describes a method with which a twisting point between two sausages can be accurately determined. This method has significant advantages, since it is also possible to determine irregularities in a twisting point with extremely high accuracy. However, a motor with a blade is activated by means of a corresponding sensor which accurately determines the twisting point or the desired cutting point, this blade finally completing the cutting operation.

The sausages are separated, for example, by blades which are driven by a servomotor. These blades rotate and in doing so sever the string of sausages. Although this cutting operation does cut through the constrictions, the clip remains in place at one end of the sausage together with a tail section of the constriction. These tail sections together with clips are extremely unaesthetic and are not desired by the customer. Therefore, the clips which have remained behind also have to be cut off, so that the sausage appears more attractive and can be sold more successfully. In the context of recent foodstuff regulations, it is necessary for clips of this type to be removed from sausages. For this purpose, by way of example, DE 295 03 611 U1 has disclosed a double blade. Furthermore, DE 100 12 149 A1 describes an apparatus in which a blade with a cutting edge rotates in a cutting action around the twisting point in front of and behind the clip.

It is an object of the present invention to provide a simple apparatus of the type described above which allows the link between two sausages to be separated in particular even when a clip is present.

SUMMARY OF THE INVENTION

The foregoing object is achieved by the present invention wherein at least two cutting edges lie opposite one another and can move toward one another when the twisting point is located between them.

It is possible for one cutting edge to be stationary and for the other cutting edge to move toward the stationary cutting edge. However, since in this case the twisting point may be entrained, it is better if both cutting edges move toward one another and cut through the twisting point as they interact.

Preferably, there should be four cutting edges lying opposite one another, with in each case two cutting edges moving toward one another. In this case, two cutting edges act in front of a clip and two cutting edges act, for example, behind a clip.

In a preferred exemplary embodiment of the invention, the cutting edges are formed out of the annular edge of a sleeve. In this case, a hollow is formed in the annular edge of the sleeve and sharpened. If the two cutting edges slide onto one another during the cutting operation, they receive the twisting point between two sausages and cut them at the latest at the base of the hollow.

The choice of two sleeves which can slide into one another, with an internal diameter of one sleeve being slightly larger than an external diameter of the other sleeve, has the advantage of providing very good guidance for the cutting device. Furthermore, the two sleeves, during the cutting operation, form a closed space in which the remainder of the twisting point, if appropriate together with the clip, which has been detached is received.

The sleeves lying opposite one another are preferably arranged on one axis and the annular edges are arranged with the cutting edges facing one another. If appropriate, this axis may lie in or slightly above a table surface on which the above-mentioned string of sausages is guided. In this case, a recess which accommodates the cutting devices and/or the main parts of the apparatus according to the invention is then formed into the table surface.

The sleeves should be assigned an advancing drive. In the exemplary embodiment selected, this is a pneumatic cylinder, but other drives, such as hydraulic cylinders, spindle drives or the like, are also conceivable.

To ensure that the remainder of the twisting point together with the clip if present can be removed from the sleeves, the sleeves are assigned strippers. A significant part of each stripper is a disk which extends perpendicular to the movement axis of the sleeves. The strippers are fixed to a cross bar but slide relative to the sleeves as they move into them. Therefore, when the cutting device is opened, the disk of the stripper pushes the remainder of the twisting point together with any clip which may be present out of the sleeve.

To allow the sleeve to move with respect to the stripper, a square, which rests in a guide slot in a lateral surface of the sleeve, is formed integrally on the sleeve. The square simultaneously has the advantage of forming two lateral sliding surfaces for the sleeve, so that the sleeve cannot move out of its movement axis.

Behind the square there is a bolt with a threaded section which passes through the above-mentioned cross bar. The stripper is then fixed on the cross bar by means of a nut.

A twisting point is preferably detected by means of a method and an apparatus as described in DE 43 18 301 C2. However, according to the invention, instead of the infrared transmitter a laser is to be used, which is fitted with lens optics such that the punctiform laser light is fanned out into a laser line. This laser line runs perpendicular to the twisting point between two sausages and forms a light curtain.

On the other side of the twisting point there are sensors, in particular photosensors, which record the laser light, likewise arranged perpendicular to the twisting point. A certain number of photosensors are covered by the twisting point, so that these sensors are unable to receive any light. It is then possible to determine an accurate image of the twisting point from the number and arrangement of the covered photosensors. Separate protection is being sought for this invention.

BRIEF DESCRIPTION OF THE DRAWINGS

Further advantages, features and details of the invention will emerge from the following description of preferred exemplary embodiments and with reference to the drawing, in which.

DETAILED DESCRIPTION

Figure 1:
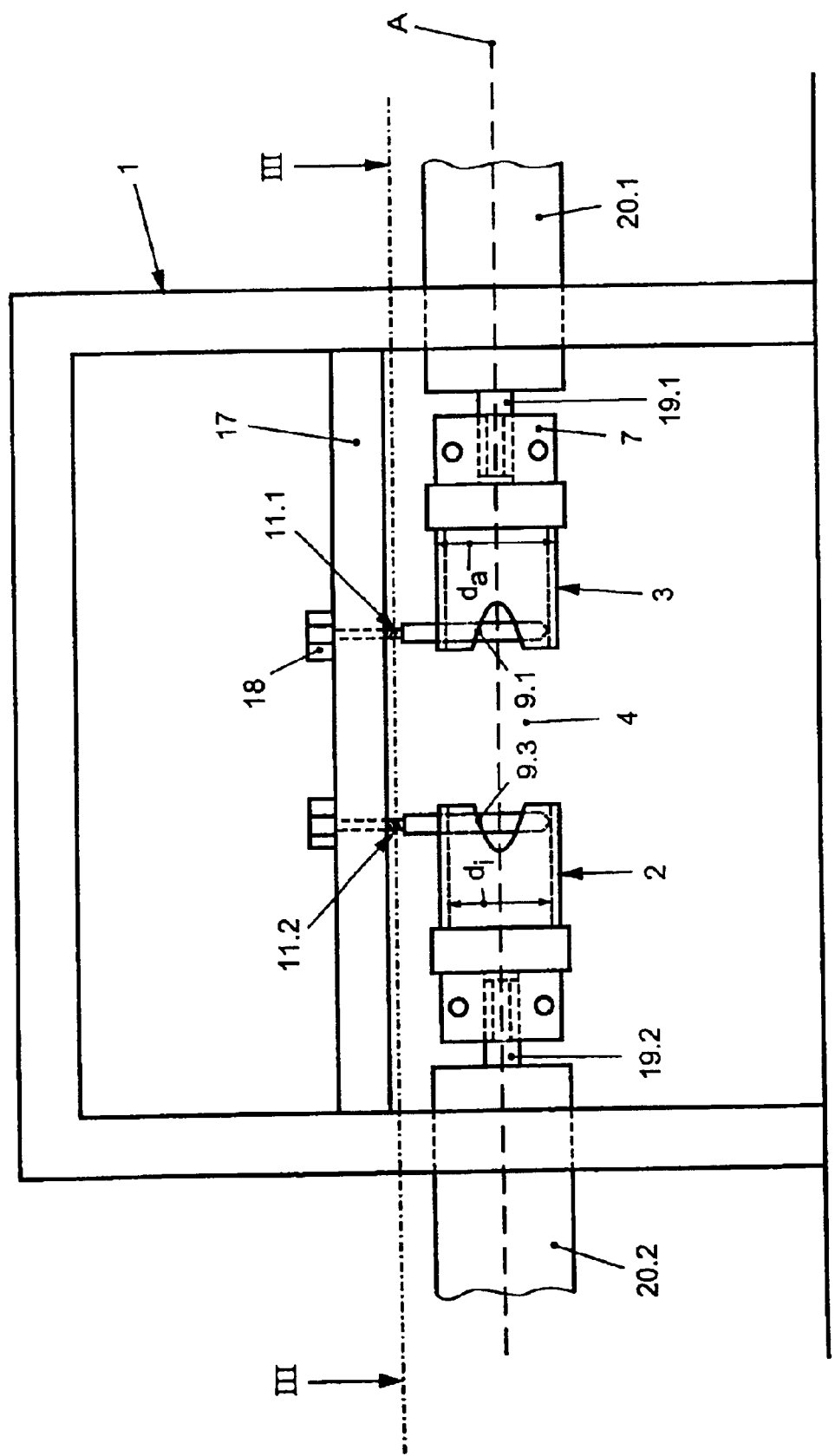
FIG. 1: shows a side view of an apparatus according to the invention for severing the link between two sausages in the open position.
Figure 2:
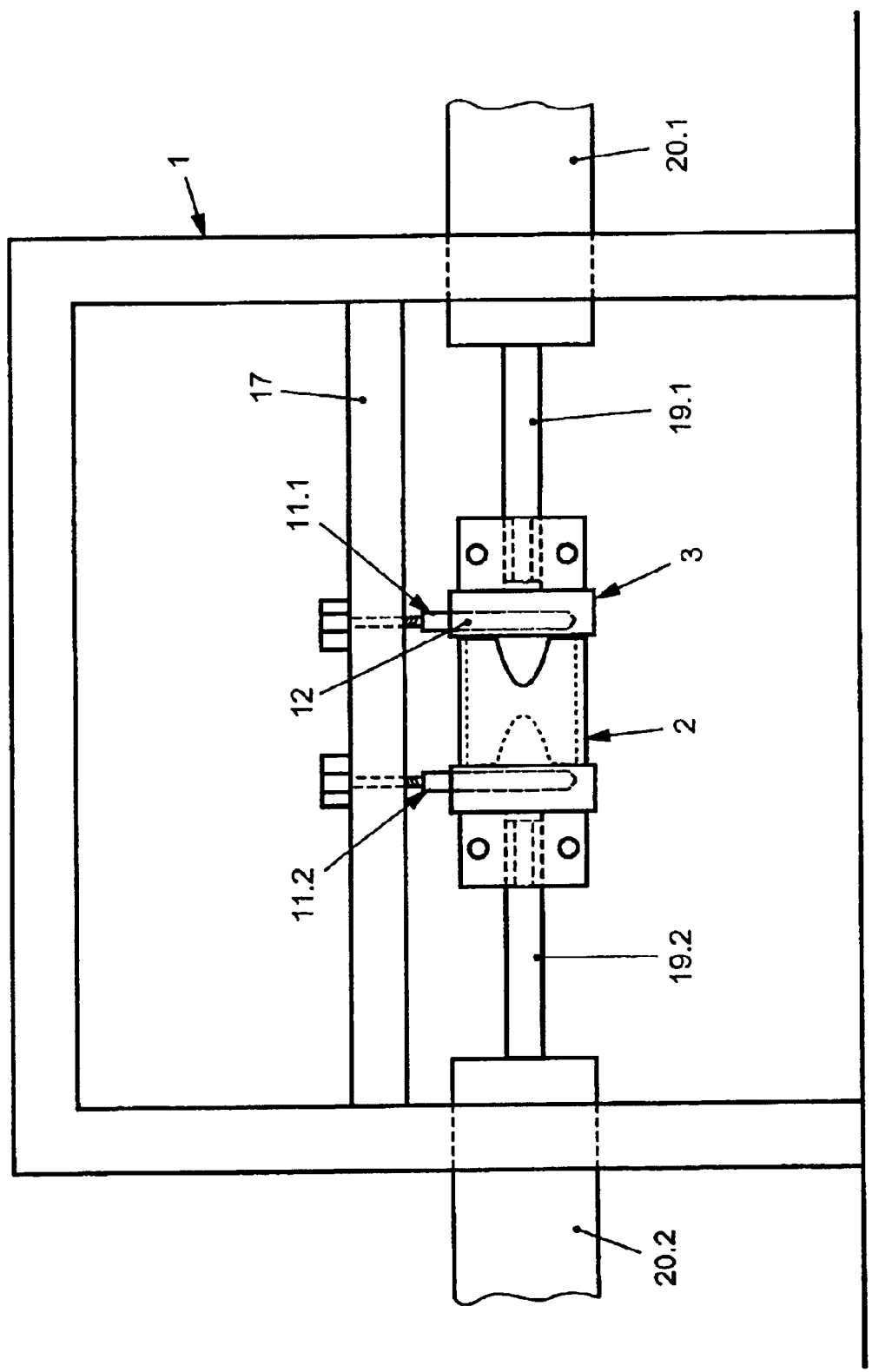
FIG. 2: shows a side view of the apparatus according to the invention shown in FIG. 1 in the closed position.

In accordance with FIGS. 1 and 2, two cutting devices 2 and 3 are located at a frame 1. These cutting devices 2 and 3 between them leave clear a space 4, through which a string of sausages (not shown in more detail) can be guided. This string of sausages comprises a large number of individual sausages which are separated from one another by a twisting point. If appropriate, one or more clips, which are generally made from metal, may be located at this twisting point.

Figure 4:
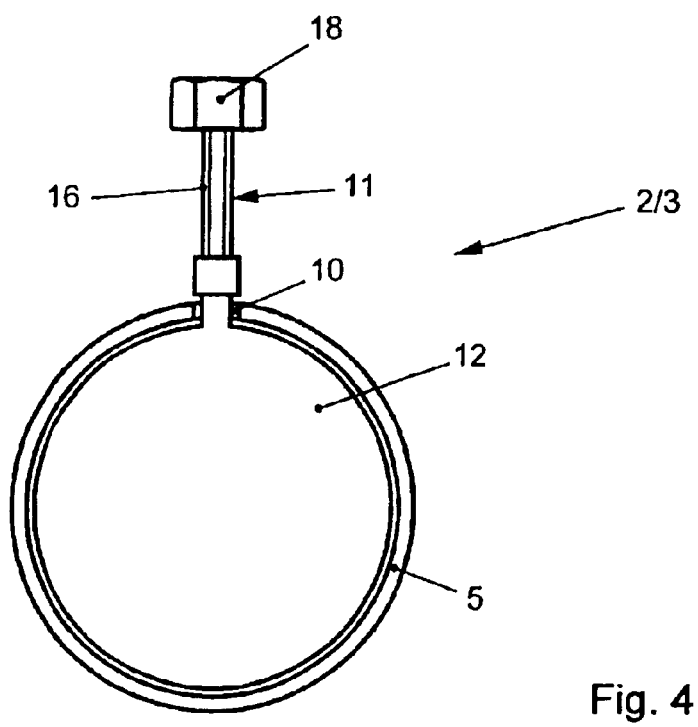
FIG. 4: shows a front view of a cutting device according to the invention with stripper.
Figure 5:
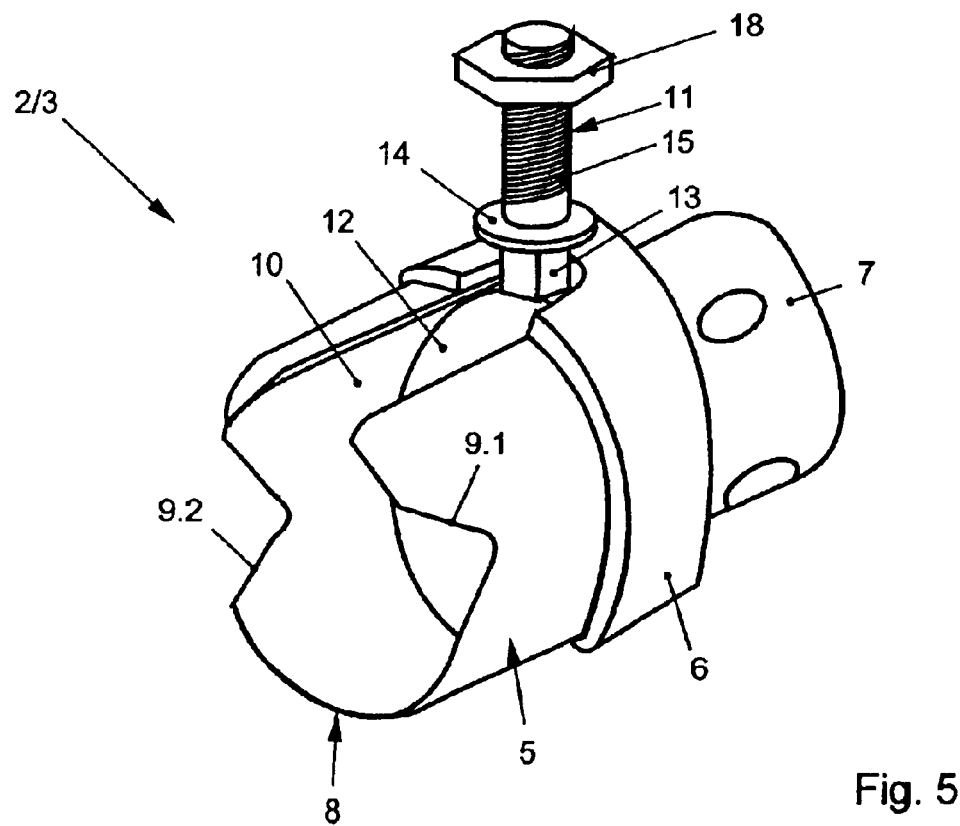
FIG. 5: shows a perspective view of the cutting device shown in FIG. 4 with stripper.

As can be seen in particular from FIGS. 4 and 5, each cutting device has a sleeve 5 which is delimited at the back by a sleeve base 6. The sleeve base 6 is adjoined by a connection piece 7.

On the opposite side, the sleeve 5 forms a free, open annular edge 8, into which two cutting edges 9.1 and 9.2 are formed opposite one another. The cutting edges 9.1 and 9.2 are formed in the shape of a hollow and are sharp-edged in the region of this hollow-like formation.

Furthermore, a slot 10, in which a stripper 11 is guided, is formed into the sleeve 5 and if appropriate partly also into the sleeve base 6 or into an annular collar projecting therefrom. The stripper 11 is positioned inside the sleeve 5 by means of a disk 12 and is positioned in the slot 10 by means of a square 13.

The square 13 is adjoined by a stop disk 14 which is followed by a bolt 15 which has a threaded section 16. As shown in FIG. 1, the threaded section 16 passes through a cross bar 17 of the frame 1, with a nut 18 screwed onto the other side of the threaded section 16.

A piston rod 19.1 of a pneumatic cylinder 20.1 is connected to the connection piece 7.

Figure 3:
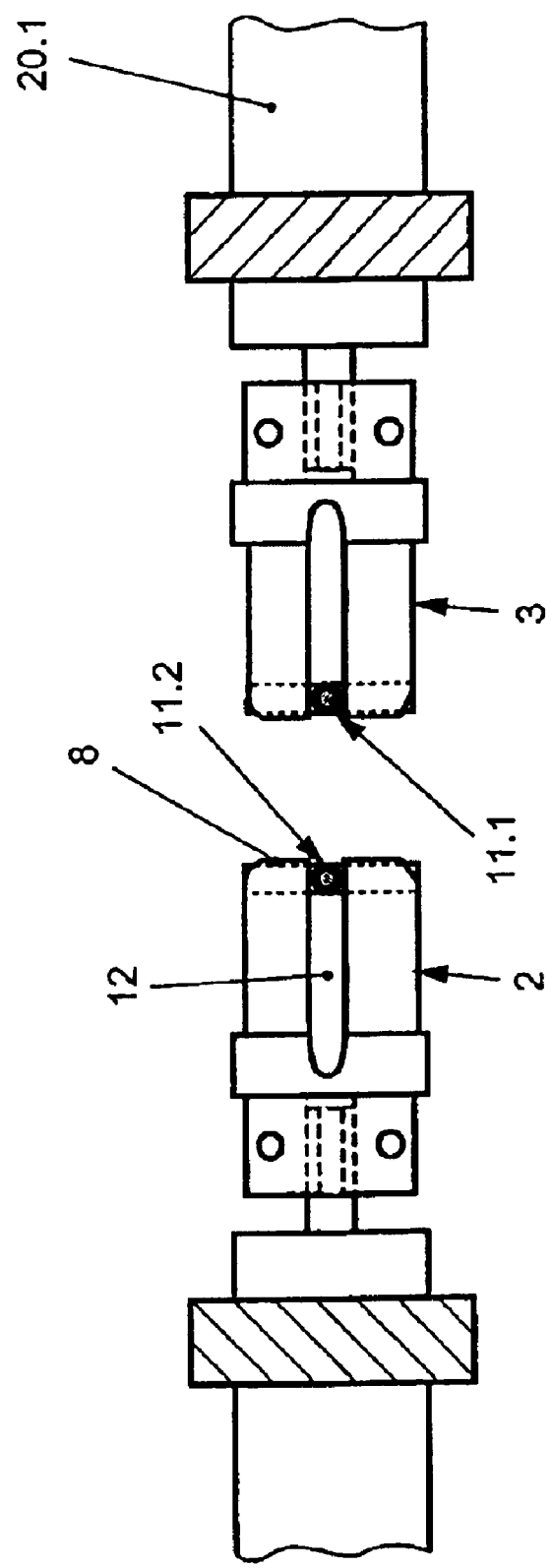
FIG. 3: shows a section through the apparatus shown in FIG. 1 on line III—III.

It can be seen from FIGS. 1 to 3 that the two cutting devices 2 and 3 lie opposite one another in the frame 1, with piston rod 19.1 and pneumatic cylinder 20.1 assigned to the cutting device 3, while the cutting device 2 has a dedicated pneumatic cylinder 20.2 and a piston rod 19.2 acting on it. Furthermore, the cutting device 2 has dedicated cutting edges; only the cutting edge 9.3 can be seen. However, the cutting device 2 has an internal diameter $d_i$ which is slightly larger than an external diameter $d_a$ of the sleeve 5 of the cutting device 3.

The movement of the piston rods 19.1 and 19.2 runs in the direction of an axis A on which the cutting devices 2 and 3 are also arranged, while the disk 12 is oriented perpendicular to this axis A.

The present invention functions in the following way:

In the starting position, the cutting devices 2 and 3 are located in the position shown in FIG. 1, with the space 4 between them left clear. As described above, the sausages belonging to the string of sausages are guided inside this space, perpendicular to the axis A. If a twisting point between two sausages is then to be severed, the two pneumatic cylinders 20.1 and 20.2 are placed under pressure, so that the piston rods 19.1 and 19.2 extend. As a result, the cutting devices 2 and 3 move toward one another, with the cutting device 3, on account of its smaller external diameter $d_a$, being able to move into the sleeve 5 of the cutting device 2. In the process, the cutting edges 9.1 to 9.3 interact with one another, so that the twisting point is severed at two locations. Should a clip be located at the twisting point, the part which has been separated out together with the clip is received in the sleeves 5.

In this closed position, the disks 12 of the strippers 11.1 and 11.2 are located in or close to the sleeve base 6. If the cutting devices 2 and 3 are then moved back into the open position, corresponding to that shown in FIG. 1, the disks 12 of the strippers 11.1 and 11.2 push the residues which have been separated out, together with any clip which may be present, out of the corresponding sleeve 5, so that these residues can drop downward. The cutting devices 2 and 3 are then ready for the next cutting operation.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for severing a link between two sausages comprising a cutting device having at least two cutting edges which lie opposite each other and further including means for moving the two cutting edges toward one another when a twisting point of said sausages is located between the at least two cutting edges, each cutting edge is formed out of an annular edge of a sleeve, wherein one sleeve has an internal diameter which is slightly larger than the external diameter of the other sleeve.

2. The apparatus as claimed in claim 1, including four cutting edges having two cutting edges lying opposite two other cutting edges, wherein the means for moving moves each of the two opposing cutting edges toward one another, wherein during the severing operation, two interacting cutting edges are arranged in front of the twisting point and two interacting cutting edges are arranged behind the twisting point.

3. The apparatus as claimed in claim 1, wherein the cutting edges at the annular edge of the sleeve lie opposite one another.

4. The apparatus as claimed in claim 1, wherein two sleeves, each having at least one cutting edge at their annular edge lie opposite one another.

5. The apparatus as claimed in claim 1, wherein the sleeves are arranged on one axis (A) and the annular edges face one another.

6. The apparatus as claimed in claim 1, wherein the sleeve, is connected to an advancing drive.

7. The apparatus as claimed in claim 6, wherein the advancing drive is a pneumatic cylinder, which engages on a sleeve base by means of a piston rod.

8. The apparatus as claimed in claim 5, wherein the cutting edges are arranged on a stripper.

9. The apparatus as claimed in claim 8, wherein the stripper is fixed to a cross bar.

10. The apparatus as claimed in claim 9, wherein the stripper engages in the sleeve by means of a disk, the disk being arranged substantially perpendicular to the axis (A).

11. The apparatus as claimed in claim 10, wherein the disk is adjoined by a square which slides in a guide slot in the lateral surface of the sleeve.

12. The apparatus as claimed in claim 11, wherein the square is adjoined by a bolt, a threaded section of which passes through the cross bar, and a nut is arranged on the other end of the threaded section.

13. The apparatus as claimed in claim 1, further including means for determining when the twisting point between two sausages is in front of the separating device, wherein the device for determining includes a laser having lens optics for linearly fanning out the laser beam transversely with respect to the twisting point, and corresponding photosensors located opposite the laser in line on the other side of the twisting point.

* * * * *